United States Patent
Yang (10) Patent No.: US 9,958,196 B2
(45) Date of Patent: May 1, 2018

(54) REFRIGERATOR DOOR FRAME APPARATUS AND METHOD

(71) Applicant: Dongbu Daewoo Electronics Corporation, Seoul (KR)

(72) Inventor: Sung Jin Yang, Seoul (KR)

(73) Assignee: DONGBU DAEWOO ELECTRONICS CORPORATION, Seoul (KR)

( * ) Notice: Subject to any disclaimer, the term of this patent is extended or adjusted under 35 U.S.C. 154(b) by 94 days.

(21) Appl. No.: 14/598,642

(22) Filed: Jan. 16, 2015

(65) Prior Publication Data

US 2016/0131412 A1    May 12, 2016

(30) Foreign Application Priority Data

Nov. 11, 2014  (KR) .................. 10-2014-0156061

(51) Int. Cl.
| | |
|---|---|
| *F25D 23/02* | (2006.01) |
| *B29C 45/56* | (2006.01) |
| *B29L 12/00* | (2006.01) |
| *B29K 9/00* | (2006.01) |
| *B29L 31/00* | (2006.01) |

(52) U.S. Cl.
CPC ............ *F25D 23/028* (2013.01); *B29C 45/56* (2013.01); *B29K 2009/00* (2013.01); *B29L 2012/00* (2013.01); *B29L 2031/7622* (2013.01)

(58) Field of Classification Search
CPC ........ F25D 23/02; F25D 23/028; F25D 23/08; B29L 2031/7622
See application file for complete search history.

(56) References Cited

U.S. PATENT DOCUMENTS

| | | | | |
|---|---|---|---|---|
| 5,007,226 A | * | 4/1991 | Nelson | F25D 23/068 52/407.2 |
| 5,520,453 A | * | 5/1996 | Aoki | E06B 3/7001 312/234 |
| 5,533,311 A | * | 7/1996 | Tirrell | B29C 51/267 312/405 |

(Continued)

FOREIGN PATENT DOCUMENTS

| | | |
|---|---|---|
| CN | 103307839 A | 9/2013 |
| CN | 203657341 U | 6/2014 |

(Continued)

*Primary Examiner* — Katherine W Mitchell
*Assistant Examiner* — Catherine A Kelly (57) ABSTRACT

The present disclosure relates to a refrigerator door frame apparatus and method. In one embodiment, a refrigerator door frame: a first side section forming a first side of the door frame; a second side section forming a second side of the door frame; a third side section forming a third side of the door frame, the third side section integrally coupled to the first side section and the second side section; and a fourth side section forming a fourth side of the door frame; the fourth side section integrally coupled to the first side section and the second side section; wherein the first side section, the second side section, the third side section, and the fourth side section are integrally formed with one another, and one or more ribs are formed on one or more of the first side section, the second side section, the third side section, and the fourth side section.

6 Claims, 10 Drawing Sheets

(56) References Cited

U.S. PATENT DOCUMENTS

| | | | |
|---|---|---|---|
| 8,567,885 B2* | 10/2013 | Lee | E05D 7/0027 |
| | | | 312/405 |
| 9,091,476 B2* | 7/2015 | Kim | F25D 23/025 |
| 9,310,123 B2* | 4/2016 | Guarino | F25D 23/02 |
| 9,360,247 B2* | 6/2016 | Park | F25D 23/028 |
| 2008/0122324 A1 | 5/2008 | Bienick | |
| 2011/0089790 A1 | 4/2011 | Lee et al. | |
| 2014/0132142 A1* | 5/2014 | Kim | F25D 23/028 |
| | | | 312/405 |
| 2016/0138855 A1* | 5/2016 | Choo | E05B 47/06 |
| | | | 312/405.1 |
| 2016/0146529 A1* | 5/2016 | Choi | F25D 23/062 |
| | | | 312/404 |

FOREIGN PATENT DOCUMENTS

| | | | |
|---|---|---|---|
| GB | 1042123 A | 9/1966 | |
| KR | 10-2010-0016672 A | 2/2010 | |

\* cited by examiner

REFRIGERATOR DOOR FRAME APPARATUS AND METHOD

CROSS-REFERENCE TO RELATED APPLICATIONS

This application claims benefit priority from Korean Patent Application No. 10-2014-0156061, filed on Nov. 11, 2014, with the Korean Intellectual Property Office, the disclosure of which is incorporated herein in its entirety by reference.

TECHNICAL FIELD

The present disclosure relates to a refrigerator door frame.

BACKGROUND

A refrigerator is an apparatus for storing food in a controlled temperature environment (e.g., to help food cool, keep food fresh, etc.). Refrigerators typically include a storage chamber that is accessible through a door which opens and closes. Traditional refrigerator doors typically include a frame assembly and a panel.

Figure 15:
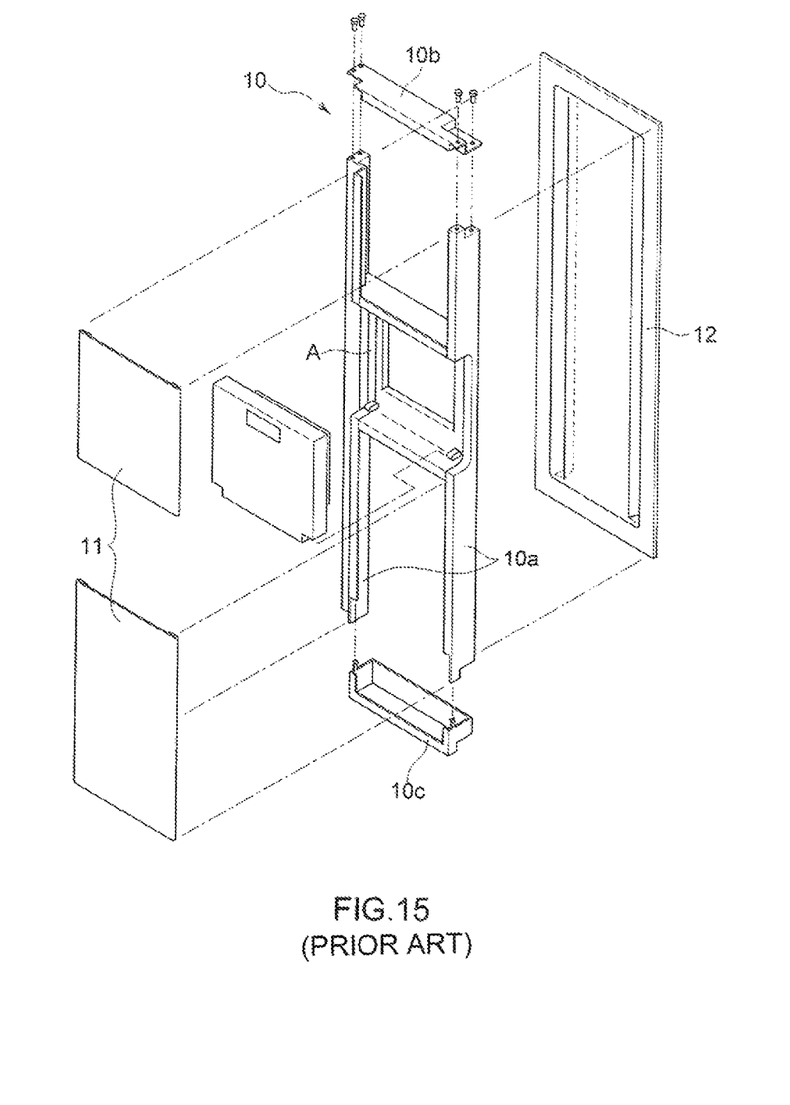
FIG. 15 is a perspective view for explaining a door frame assembly in the related art.

FIG. 15 is a block diagram illustration of a exemplary traditional refrigerator door including a frame assembly 10, a front panel 11 which is provided at a front side of the frame assembly 10, and a rear panel 12 which is provided at a rear side of the frame assembly 10. The frame assembly 10 includes both lateral side frames 10a which include a home-bar seating portion A, an upper frame 10b which is coupled to an upper side of both the lateral side frames 10a, and a lower frame 10c which is coupled to a lower side of both the lateral side frames 10a.

Conventional frame assembly configurations (e.g., frame assembly 10) can give rise to a number of issues or problems. Coupling members (for example, screws for coupling the plurality of frames sides or frame pieces 10a, 10b, and 10c, etc.) and reinforcing members (for example, ribs) to ensure durability are separately required and typically increase costs to manufacture the conventional door frames. In addition, work associated with coupling the respective frame pieces is required. Significant effort and work can be also expended to prevent urethane foam resin filled within the respective frames from leaking through the connection portions between the frames pieces. These issues and problems can cause decreases in manufacturing efficiency. Furthermore, because the respective frames 10a, 10b, and 10c are coupled to each other, gaps can form between the frame pieces or the frames are easily bent, such that durability of the door deteriorates.

SUMMARY

A refrigerator door frame apparatus and method are described. In one embodiment the refrigerator door frame is integrally formed and can include a reinforcing member. In one exemplary implementation, a refrigerator door frame comprises: a first side section forming a first side of the door frame; a second side section forming a second side of the door frame; a third side section forming a third side of the door frame, the third side section integrally coupled to the first side section and the second side section; and a fourth side section forming a fourth side of the door frame; the fourth side section integrally coupled to the first side section and the second side section; wherein the first side section, the second side section, the third side section, and the fourth side section are integrally formed with one another, and one or more ribs are formed on one or more of the first side section, the second side section, the third side section, and the fourth side section.

Another embodiment implementation, a refrigerator door frame comprises: a first side section forming a first side of the door frame; a second side section forming a second side of the door frame; a third side section forming a third side of the door frame, the third side section integrally coupled to the first side section and the second side section; and a fourth side section forming a fourth side of the door frame; the fourth side section integrally coupled to the first side section and the second side section; wherein the first side section, the second side section, the third side section, and the fourth side section are integrally formed with one another, and one or more ribs are formed on one or more of the first side section, the second side section, the third side section, and the fourth side section; wherein the first side section further includes: a first seating frame portion is operable to be coupled to a front panel; a first supporting frame portion which is extended from the first seating frame portion; and a second seating frame portion is extended from the first supporting frame portion, wherein the second seating frame portion is operable to be coupled to a rear panel; wherein at least one of the ribs on the first side section is coupled to at least one of the first seating frame portion, the first supporting frame portion, and the second seating frame portion; and the second side section further includes: a third seating frame portion is operable to be coupled to the front panel; a second supporting frame portion which is extended from the third seating frame portion; and a fourth seating frame portion which is extended from the second supporting frame portion, wherein the fourth seating frame portion is operable to be coupled to the rear panel; wherein at least one of the ribs on the second side section is coupled to at least one of the third seating frame portion, the second supporting frame portion, and the fourth seating frame portion.

Yet another exemplary implementation, a method of manufacturing a refrigerator door frame, including: a) preparing a slide mold; b) forming a door frame in the slide mold, including injecting resin, and integrally forming a refrigerator door frame, which includes a first side section, a second side section, a third side section and a fourth side section wherein one or more ribs are formed on the first side section, the second side section, the third side section, and the fourth side section, respectively; and c) removing the door frame from the slide mold.

According to the refrigerator door frame according to the present disclosure, a plurality of frames having one or more ribs formed thereon is integrally formed by being manufactured by one injection molding process, and thus has manufacturing efficiency (productivity or economic efficiency) and durability better than a door frame assembly in the related art.

This summary contains, by necessity, simplifications, generalizations and omissions of detail; consequently, those skilled in the art will appreciate that the summary is illustrative only and is not intended to be in any way limiting. Other aspects, inventive features, and advantages of the present invention, as defined by the claims, will become apparent in the non-limiting detailed description set forth below

BRIEF DESCRIPTION OF THE DRAWINGS

The accompanying drawings, which are incorporated in and form a part of this specification, illustrate embodiments of the invention by way of example and not by way of limitation. The drawings referred to in this specification should be understood as not being drawn to scale except if specifically noted.

DETAILED DESCRIPTION

Reference will now be made in detail to the embodiments of the invention, examples of which are illustrated in the accompanying drawings. While the invention will be described in conjunction with the embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set fourth in order to provide a thorough understanding of the present invention. However, one of ordinary skill in the art will recognize that the present invention may be practiced without these specific details. In other instances, well known methods, procedures, components, and circuits have not been described in detail as not to unnecessarily obscure aspects of the present invention.

Figure 1:
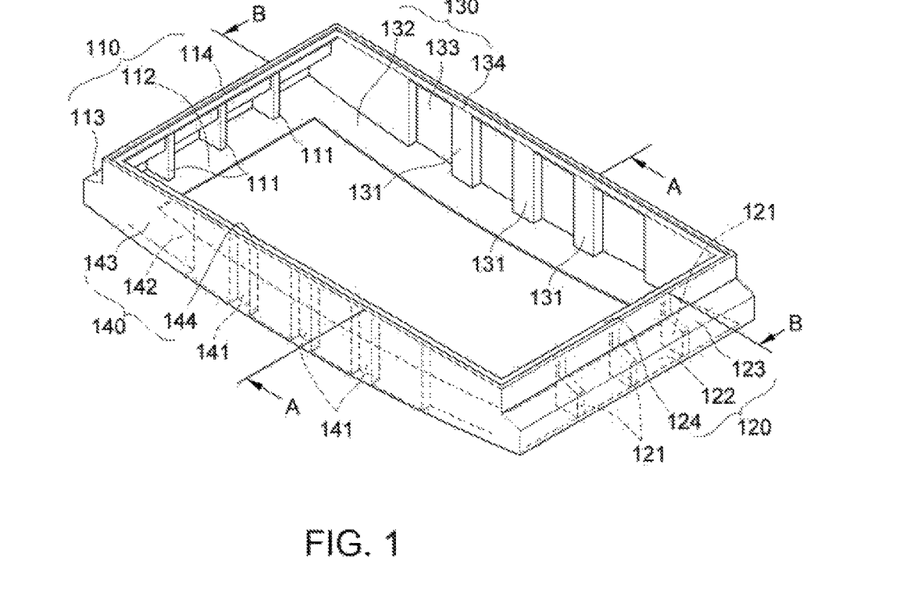
FIG. 1 is a perspective view of an exemplary refrigerator door frame in accordance with one embodiment of the present disclosure.

FIG. 1 is a perspective view of an exemplary refrigerator door frame in accordance with one embodiment of the present invention. The refrigerator door frame includes a first side frame or section 110, a second side frame or section 120, a third side frame or section 130, and fourth side frame or section 140. In one exemplary implementation, the first side section 110 forms a left side of the door frame, the second side section 120 forms a right side of the door frame, the third side section 130 forms an upper side of the door frame, the fourth side section 140 forms a lower side of the door frame. In one embodiment, one or more ribs 111 (e.g., a first set of ribs, etc.) are formed on the first side section 110. The number of ribs 111 and arrangement intervals between the ribs 111 formed on the first side section 110 can vary. In one exemplary implementation, three to ten ribs 111 are formed at equal intervals.

Figure 2:
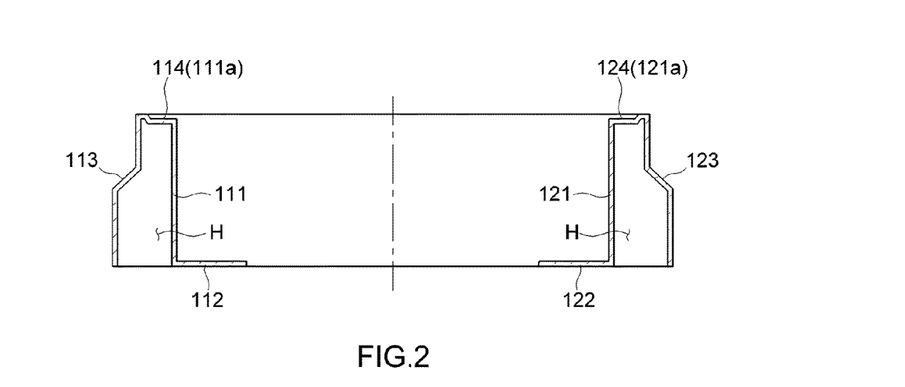
FIG. 2 is a cross-sectional view of an exemplary refrigerator door frame in accordance with one embodiment of the present disclosure.

FIG. 2 is a cross-sectional view of an exemplary refrigerator door frame in accordance with one embodiment of the present invention. The cross-sectional view in FIG. 2 corresponds to or is cut at cross section line BB in FIG. 1. In one exemplary implementation, the first side section 110 includes a first seating frame portion 112, a first supporting frame portion 113 which extends from one end of the first seating frame portion 112, and a second seating frame portion 114 which is extended from one end of the first supporting frame portion 113. The first seating frame portion 112 is operable to accept a front panel (e.g., the front panel can be seated on or coupled to the first seating frame portion 112, etc.). The second seating frame portion 114 is operable to accept a rear panel (e.g., the rear panel can be seated on or coupled to the second seating frame portion 114, etc.). The first supporting frame portion 113 can include a sloped section and bends. The second seating frame portion 114 can include a bend. The one or more ribs 111 may be coupled to at least one of the first seating frame portion 112, the first supporting frame portion 113, and the second seating frame portion 114. The one or more ribs 111 can be formed and integrally coupled to one surface of the first seating frame portion 112, one surface of the first supporting frame portion 113, and one surface of the second seating frame portion 114. In one exemplary implementation in which the one or more ribs 111 are coupled to one surface of the second seating frame portion 114, an upper end 111a of the rib 111 becomes a part of the second seating frame portion 114, such that a rear panel can be seated on or coupled to the upper end 111a of the rib 111.

In one embodiment, one or more ribs 121 (e.g., a second set of ribs, etc.) are formed on the second side section 120. The number of ribs 121 and arrangement intervals between the ribs 121 formed on the second side section 120 can vary. In one exemplary implementation, three to ten ribs 121 are formed at equal intervals.

In one embodiment, the second side section 120 includes a third seating frame portion 122, a second supporting frame portion 123 which extends from one end of the third seating frame portion 122, and a fourth seating frame portion 124 which extends from one end of the second supporting frame portion 123. The third seating frame portion 122 is operable to accept a front panel (e.g., the front panel can be seated on or coupled to the third seating frame portion 122, etc.). The fourth seating frame portion 124 is operable to accept a rear panel (e.g., the rear panel can be seated on or coupled to the fourth seating frame portion 124, etc.). The second supporting frame portion 123 can include a sloped section and bends. The fourth seating frame portion 124 can include a bend. In addition, the one or more ribs 121 may be formed and integrally coupled to at least one of the third seating frame portion 122, the second supporting frame portion 123, and the fourth seating frame portion 124. The one or more ribs 121 can be integrally coupled to one surface of the third seating frame portion 122, one surface of the second supporting frame portion 123, and one surface of the fourth seating frame portion 124. In one exemplary implementation in which the one or more ribs 121 are integrally coupled to one surface of the fourth seating frame portion 124, an upper end 121a of the rib 121 becomes a part of the fourth seating frame portion 124, such that the rear panel can be seated on the upper end 121a of the rib 121.

The third side section (e.g., upper frame section) 130 can be coupled to the first side section 110 and the second side section 120. In one embodiment, one or more ribs 131 (e.g., a third set of ribs, etc.) are formed inside the third side section 130. The number of ribs 131 and arrangement intervals between the ribs 131 formed on the third side section 130 can vary. In one exemplary implementation three to ten ribs 131 are formed at equal intervals.

Figure 3:
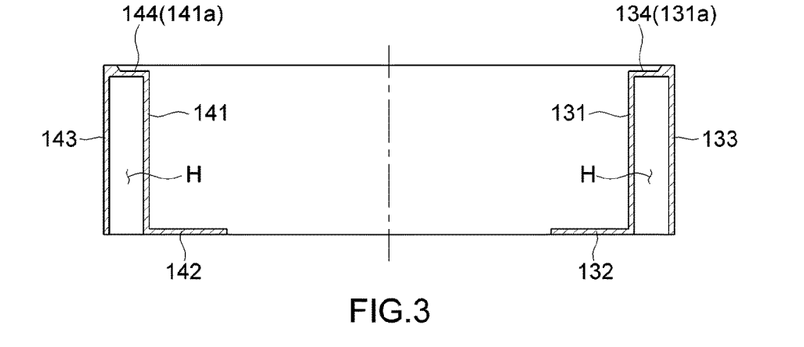
FIG. 3 is another cross-sectional view of an exemplary refrigerator door frame in accordance with one embodiment of the present disclosure.

FIG. 3 is a cross-sectional view of an exemplary refrigerator door frame in accordance with one embodiment of the present invention. The cross-sectional view in FIG. 3 corresponds to or is cut at cross section line AA in FIG. 1. In one embodiment the third side section 130 includes a fifth seating frame portion 132, a third supporting frame portion 133 which extends from one end of the fifth seating frame portion 132, and a sixth seating frame portion 134 which extends from one end of the third supporting frame portion 133. The fifth seating frame portion 132 is operable to accept a front panel (e.g., the front panel can be seated on or coupled to the fifth seating frame portion 132, etc.). The sixth seating frame portion 134 is operable to accept a rear panel (e.g., the rear panel can be seated on or coupled to the sixth seating frame portion 134, etc.). The third supporting frame portion 133 can include a sloped section and bends. The sixth seating frame portion 134 can include a bend. The one or more ribs 131 can be formed and integrally coupled to at least one of the fifth seating frame portion 132, the third supporting frame portion 133, and the sixth seating frame portion 134. The one or more ribs 131 can be coupled to one surface of the fifth seating frame portion 132, one surface of the third supporting frame portion 133, and one surface of the sixth seating frame portion 134. In one exemplary implementation in which the one or more ribs 131 are coupled to the one surface of the sixth seating frame portion 134, an upper end 131a of the rib 131 becomes a part of the sixth seating frame portion 134, such that a rear panel can be seated on the upper end 131a of the rib 131.

The fourth side section 140 (e.g., lower frame section) can be coupled to the first side section 110 and the second side section 120. In one embodiment, one or more ribs 141 (e.g. a fourth set of ribs) are formed inside the fourth side section 140. The number of ribs 141 and arrangement intervals between the ribs 141 formed on the fourth side section 140 can vary. In one exemplary implementation, three to ten ribs 141 are formed at equal intervals.

In one embodiment, the fourth side section 140 includes a seventh seating frame portion 142, a fourth supporting frame portion 143 which extends from one end of the seventh seating frame portion 142, and an eighth seating frame portion 144 which extends from one end of the fourth supporting frame portion 143. The seventh seating frame portion 142 is operable to accept a front panel (e.g., the front panel can be seated on or coupled to the seventh seating frame portion 142, etc.). The eighth seating frame portion 144 is operable to accept a rear panel (e.g., the rear panel can be seated on or coupled to the eighth seating frame portion 144, etc.). The fourth supporting frame portion 143 can include a sloped section and bends. The eighth seating frame portion 144 can include a bend. The one or more ribs 141 can be formed and integrally coupled to at least one of the seventh seating frame portion 142, the fourth supporting frame portion 143, and the eighth seating frame portion 144. The one or more ribs 141 can be coupled to one surface of the seventh seating frame portion 142, one surface of the fourth supporting frame portion 143, and one surface of the eighth seating frame portion 144. In one exemplary implementation in which the one or more ribs 141 are coupled to one surface of the eighth seating frame portion 144, an upper end 141a of the rib 141 becomes a part of the eighth seating frame portion 144, such that a rear panel can be seated on the upper end 141a of the rib 141.

The one or more ribs 111 formed on the first side section 110, the one or more ribs 121 formed on the second side section 120, the one or more ribs 131 formed on the third side section 130, and the one or more ribs 141 formed on the fourth side frame 140 can be formed with hollow spaces therein, respectively. The hollow spaces (e.g., designed by the reference H in FIG. 2, FIG. 3, etc.) are formed in the ribs 111, 121, 131, and 141 of the respective side sections 110, 120, 130, and 140, respectively. The hollow spaces H formed in the ribs 111, 121, 131, and 141 can help reduce or prevent contraction and deformity in the respective ribs 111, 121, 131, and 141.

In one exemplary implementation, the refrigerator door frame can be formed by injection molding using resin, and as a result, in a case in which the respective ribs 111, 121, 131, and 141 are filled with resin, surfaces of the ribs 111, 121, 131, and 141 may contract or deform due to characteristics of the resin. However, hollow spaces formed in the ribs 111, 121, 131, and 141, respectively, help reduce or prevent contraction and deformity in the surfaces of the ribs 111, 121, 131, and 141.

In one embodiment, since the first side section 110, the second side section 120, the third side section 130, and the fourth side section 140 are integrally formed, a separate coupling member for coupling the respective side sections (or frames) 110, 120, 130, and 140 is not required. For example, the first side section 110, the second side section 120, the third side section 130, and the fourth side section 140 are integrally formed by one injection molding process. In addition, because the one or more ribs 111, 121, 131, and 141 and the respective side sections (or frames) 110, 120, 130, and 140 are integrally formed or manufactured, a separate reinforcing member for reinforcing the respective side sections (or frames) 110, 120, 130, and 140 is not required.

Figure 4:
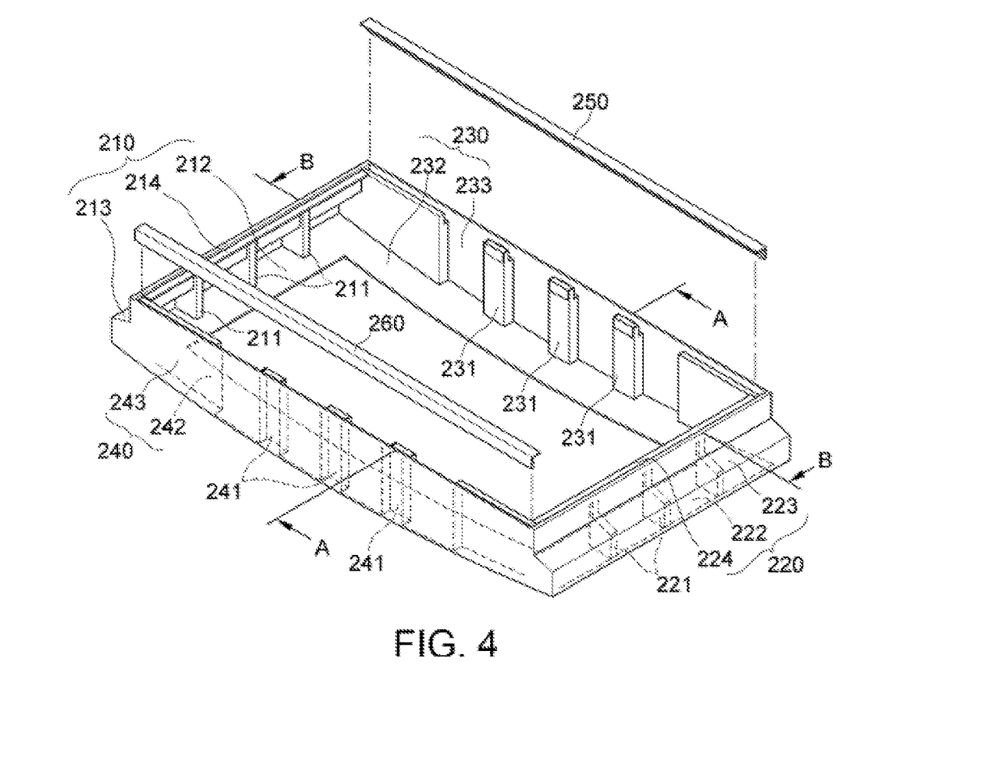
FIG. 4 is a perspective view of another exemplary refrigerator door frame in accordance with one embodiment of the present disclosure.

A refrigerator door frame according to another exemplary embodiment of the present disclosure includes a first side section, a second side section, a third side section, and a fourth side section. The first side section, the second side section, the third side section and the fourth side section can include one or more ribs. In one exemplary implementation, the refrigerator door frame further includes a first panel seating member and a second panel seating member that are disposed at upper sides of the third side section and the fourth side section.

FIG. 4 is a perspective view of another exemplary refrigerator door frame in accordance with one embodiment of the present invention. The refrigerator door frame includes a first side frame or section 210, a second side frame or section 220, a third side frame or section 230, and fourth side frame or section 240. In one exemplary implementation, the first side section 210 forms a left side of the door frame, the second side section 220 forms a right side of the door frame, the third side section 230 forms an upper side of the door frame, the fourth side section 240 forms a lower side of the door frame.

Figure 5:
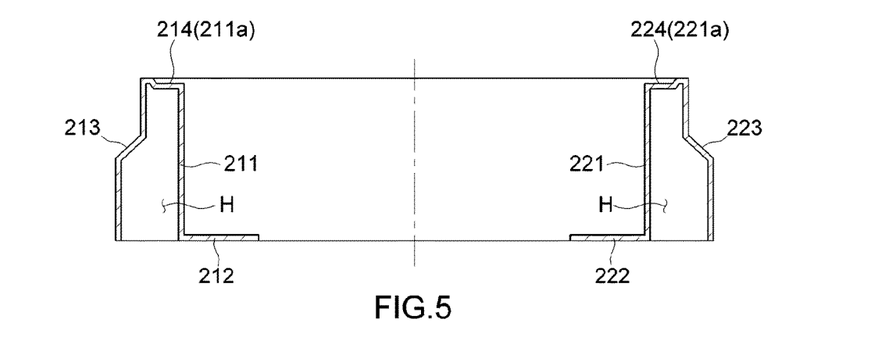
FIG. 5 is a cross-sectional view of another exemplary refrigerator door frame in accordance with one embodiment of the present disclosure.

FIG. 5 is a cross-sectional view of an exemplary refrigerator door frame in accordance with one embodiment of the present invention. The cross-sectional view in FIG. 5 corresponds to or is cut at cross section line BB in FIG. 4. A first side section 210 includes a first seating frame portion 212 on which a front panel can be seated, a first supporting frame portion 213 which extends from one end of the first seating frame portion 212, and a second seating frame portion 214 which extends from one end of the first supporting frame portion 213 and on which a rear panel can be seated.

One or more ribs 211 (e.g., a fifth set of ribs, etc.), which are formed on the first side section 210, are coupled to at least one of the first seating frame portion 212, the first supporting frame portion 213, and the second seating frame portion 214. The one or more ribs 211 can be formed and integrally coupled to one surface of the first seating frame portion 212, one surface of the first supporting frame portion 213, and one surface of the second seating frame portion 214. In one exemplary implementation in which the one or more ribs 211 are coupled to the one surface of the second seating frame portion 214, an upper end 211a of the rib 211 becomes a part of the second seating frame portion 214, such that the rear panel is seated on the upper end 211a of the rib 211.

A second side section 220 includes a third seating frame portion 222 on which the front panel can be seated, a second supporting frame portion 223 which extends from one end of the third seating frame portion 222, and a fourth seating frame portion 224 extends from one end of the second supporting frame portion 223 and on which the rear panel can be seated.

One or more ribs 221 (e.g., a sixth set of ribs, etc.), which are formed on the second side section 220, are coupled to at least one of the third seating frame portion 222, the third supporting frame portion 223, and the fourth seating frame portion 224. The one or more ribs 221 can be formed and integrally coupled to one surface of the third seating frame portion 222, one surface of the third supporting frame portion 223, and one surface of the fourth seating frame portion 224. In one exemplary implementation in which the one or more ribs 221 are coupled to the one surface of the fourth seating frame portion 224, an upper end 221a of the rib 221 becomes a part of the fourth seating frame portion 224, such that the rear panel is seated on the upper end 221a of the rib 221.

Figure 6:
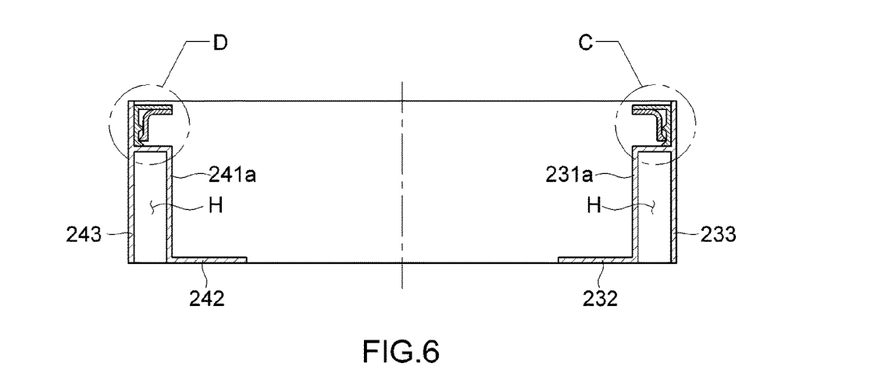
FIG. 6 is a cross-sectional view of another exemplary refrigerator door frame in accordance with one embodiment of the present disclosure.

FIG. 6 is a cross-sectional view of an exemplary refrigerator door frame in accordance with one embodiment of the present invention. The cross-sectional view in FIG. 5 corresponds to or is cut at cross section line AA in FIG. 4. The third side section 230, which is included in the refrigerator door frame according to the second exemplary embodiment of the present disclosure, is provided at upper sides of the first side section 210 and the second side section 220, and one or more ribs (e.g., a seventh set of ribs, etc.) 231 are formed inside the third side section 230. The number of ribs 231 and arrangement intervals between the ribs 231 formed on the third side section 230 can vary. In one exemplary implementation, three to ten ribs 231 may be formed to be arranged at equal intervals. The third side section 230 can include a fifth seating frame portion 232 on which the front panel is seated, and a third supporting frame portion 233 which is bent and extended from one end of the fifth seating frame portion 232.

The one or more ribs 231, which are formed on the third side section 230, are coupled to one surface of the fifth seating frame portion 232, and one surface of the third supporting frame portion 233, and include structures for disposing or supporting a first panel seating member 250 that will be described below.

Figure 7:
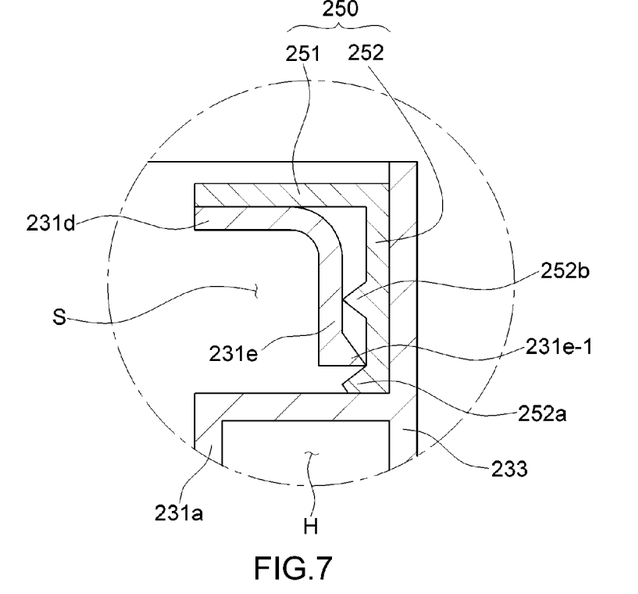
FIG. 7 is an enlarged view of part C illustrated in FIG. 6.

FIG. 7 is an enlarged view of portion C illustrated in FIG. 6. The one or more ribs 231, which are formed on the third side section 230, include a first rib main body portion 231a, a first supporting portion 231b, a second supporting portion 231c, a first connecting portion 231d, and a first fixing portion 231e.

The first rib main body portion 231a, which is included in the rib 231, is coupled to the fifth seating frame portion 232 and the third supporting frame portion 233 of the third side section 230.

The first supporting portion 231b, which is included in the rib 231, is extended upward from one end of the first rib main body portion 231a, and spaced apart from the third supporting frame portion 233 at a predetermined distance.

The second supporting portion 231c, which is included in the rib 231, is extended upward from the other end of the first rib main body portion 231a, and spaced apart from the third supporting frame portion 233 at a predetermined distance.

The first connecting portion 231d, which is included in the rib 231, horizontally connects the first supporting portion 231b and the second supporting portion 231c. Since the first supporting portion 231b and the second supporting portion 231c are connected to each other by the first connecting portion 231d, a predetermined space S is provided at an upper side of the first rib main body portion 231a, and the corresponding space S is filled with resin, thereby improving durability and thermal insulation performance of the refrigerator door frame. In one exemplary implementation, the resin is urethane.

The first fixing portion 231e, which is included in the rib 231, includes a bend and is extended downward from one end (e.g., at a center of the one end, etc.) of the first connecting portion 231d, and fixes or secures the first panel seating member 250. Here, a first projection 231e-1, which protrudes toward the third supporting frame portion 233, may be further formed at one end of the first fixing portion 231e in order to increase fixing or coupling force of the first panel seating member 250.

Figure 9:
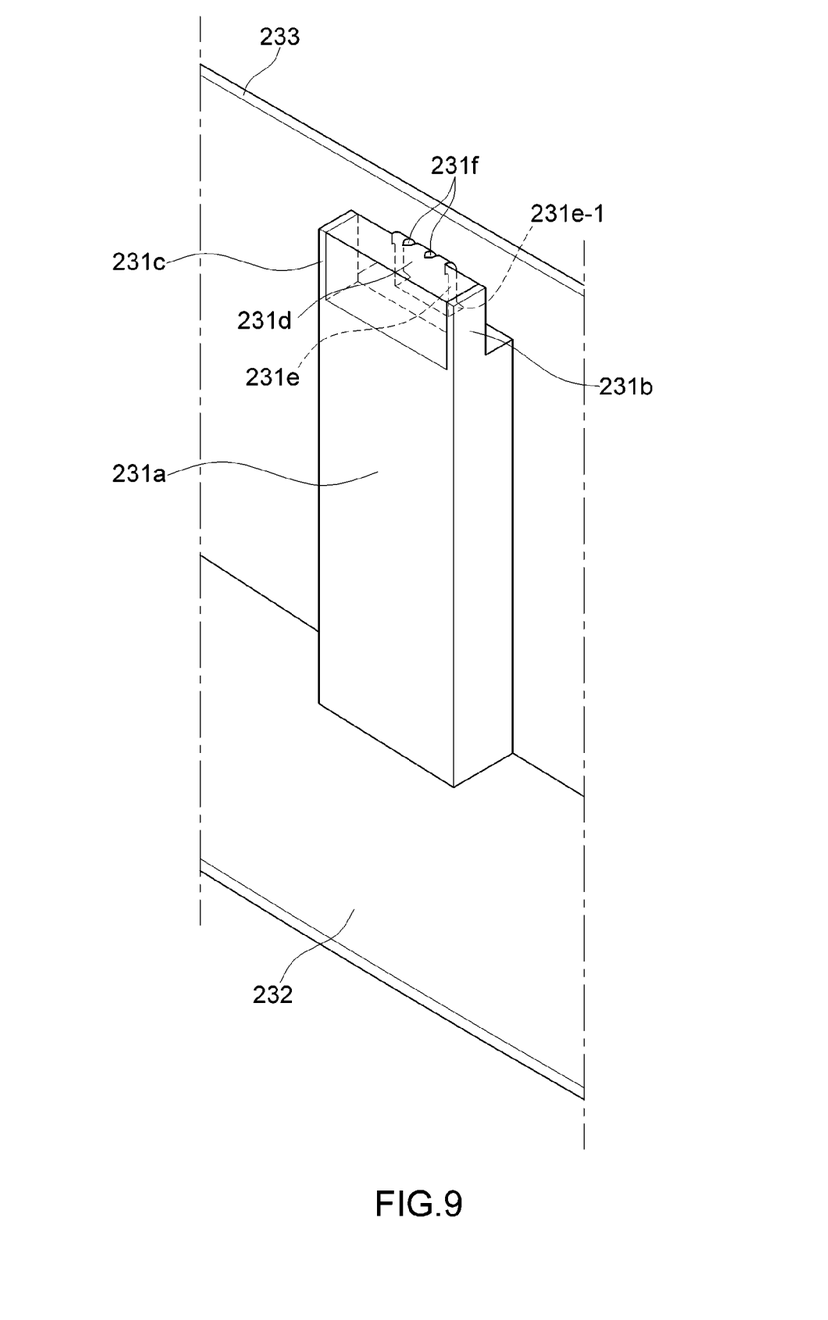
FIG. 9 is a perspective view of another exemplary part of a refrigerator door frame according to one embodiment of the present disclosure.

FIG. 9 is a perspective view of an exemplary part of the refrigerator door frame according to one embodiment of the present disclosure. The rib 231 can include first cut-off portions 231f that are formed by cutting a part of a connection portion between the first connecting portion 231d and the first fixing portion 231e. The first fixing portion 231e is more naturally curved from the first connecting portion 231d by the first cut-off portions 231f, and fixing or coupling force applied to the first panel seating member 250 may be increased.

In one embodiment, a refrigerator door frame includes the first panel seating member 250 on which the rear panel is seated. The first panel seating member 250 includes a first seating portion 251, and a first withdrawal prevention portion 252, and is disposed or located at an upper side of the third side section 230 (e.g., at an upper side of the first rib main body portion 231a, etc.).

The first seating portion 251, which is included in the first panel seating member 250, is seated on an upper portion of the first connecting portion 231d of the rib 231.

The first withdrawal prevention portion 252, which is included in the first panel seating member 250, includes a bend and is extended from one end of the first seating portion 251 and disposed or located (e.g., interposed, etc.) between the first fixing portion 231e of the rib 231 and the third supporting frame portion 233, thereby preventing the first panel seating member 250 from being withdrawn. A second projection 252a, which protrudes in one direction, may be further formed at one end of the first withdrawal prevention portion 252 in order to increase coupling force with the first fixing portion 231e. In addition, a third projection 252b, which protrudes in one direction, may also be further formed at a center of the first withdrawal prevention portion 252.

The fourth side section 240, which is included in the refrigerator door frame according to the second exemplary embodiment of the present disclosure, is provided at lower sides of the first side section 210 and the second side section 220, and one or more ribs 241 (e.g., an eighth set of ribs, etc.) are formed inside the fourth side section 240. The number of ribs 241 and arrangement intervals between the ribs 241 formed on the fourth side section 240 can vary. In one exemplary implementation, three to ten ribs 241 may be formed to be arranged at equal intervals. The fourth side section 240 may include a seventh seating frame portion 242 on which the front panel is seated, and a fourth supporting frame portion 243 which is bent and extended from one end of the seventh seating frame portion 242.

The one or more ribs 241, which are formed on the fourth side section 240, are coupled to one surface of the seventh seating frame portion 242, and one surface of the fourth supporting frame portion 243, and include structures for disposing or supporting a second panel seating member 260 that will be described below.

Figure 8:
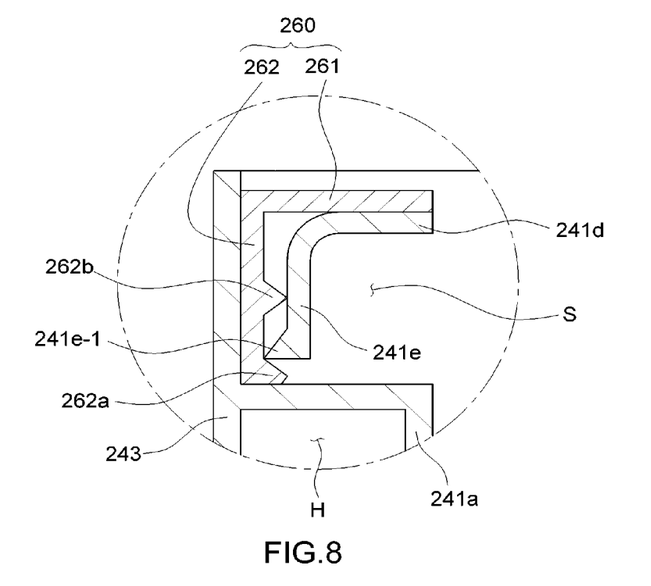
FIG. 8 is an enlarged view of part D illustrated in FIG. 6.

FIG. 8 is an enlarged view of part D illustrated in FIG. 6. The one or more ribs 241, which are formed on the fourth side section 240, include a second rib main body portion 241a, a third supporting portion 241b, a fourth supporting portion 241c, a second connecting portion 241d, and a second fixing portion 241e.

The second rib main body portion 241a, which is included in the rib 241, is coupled to the seventh seating frame portion 242 and the fourth supporting frame portion 243 of the fourth side section 240.

The third supporting portion 241b, which is included in the rib 241, is extended upward from one end of the second rib main body portion 241a, and spaced apart from the fourth supporting frame portion 243 at a predetermined distance.

The fourth supporting portion 241c, which is included in the rib 241, is extended upward from the other end of the second rib main body portion 241a, and spaced apart from the fourth supporting frame portion 243 at a predetermined distance.

The second connecting portion 241d, which is included in the rib 241, horizontally connects the third supporting portion 241b and the fourth supporting portion 241c. Since the third supporting portion 241b and the fourth supporting portion 241c are connected to each other by the second connecting portion 241d as described above, a predetermined space S is provided at an upper side of the second rib main body portion 241, and the corresponding space S is filled with resin (for example, urethane), thereby improving durability and thermal insulation performance of the refrigerator door frame.

The second fixing portion 241e, which is included in the rib 241, is bent and extended downward from one end (specifically, at a center of the one end) of the second connecting portion 241d, and fixes the second panel seating member 260. Here, a fourth projection 241e-1, which protrudes toward the fourth supporting frame portion 243, may be further formed at one end of the second fixing portion 241e in order to increase fixing force of the second panel seating member 260.

Figure 10:
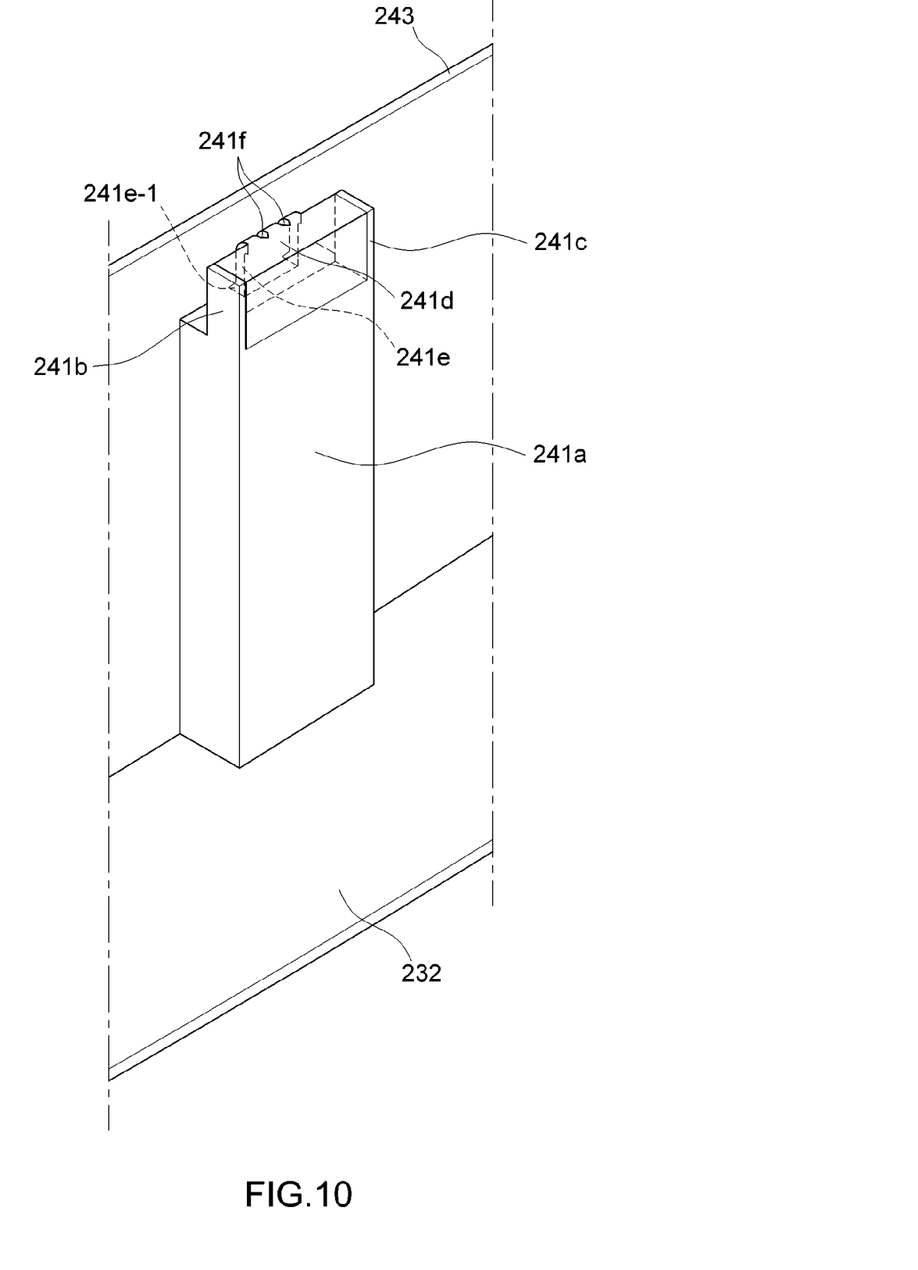
FIG. 10 is a perspective view of another exemplary part of the refrigerator door frame according to one embodiment of the present disclosure.

FIG. 10 is a perspective view of an exemplary part of the refrigerator door frame according to one embodiment of the present disclosure. The rib 241 can include second cut-off portions 241f that are formed by cutting a part of a connection portion between the second connecting portion 241d and the second fixing portion 241e. The second fixing portion 241e is more naturally curved from the second connecting portion 241d by the second cut-off portions 241f, and fixing force applied to the second panel seating member 260 may be increased.

The refrigerator door frame according to the second exemplary embodiment of the present disclosure further includes the second panel seating member 260 on which the rear panel is seated. The second panel seating member 260 includes a second seating portion 261, and a second withdrawal prevention portion 262, and is disposed at an upper side of the fourth side section 240 (specifically, at an upper side of the second rib main body portion 241a).

The second seating portion 261, which is included in the second panel seating member 260, is seated on an upper portion of the second connecting portion 241d of the rib 241.

The second withdrawal prevention portion 262, which is included in the second panel seating member 260, is bent and extended from one end of the second seating portion 261 and disposed (interposed) between the second fixing portion 241e of the rib 241 and the fourth supporting frame portion 243, thereby preventing the second panel seating member 260 from being withdrawn. Here, a fifth projection 262a, which protrudes in one direction, may be further formed at one end of the second withdrawal prevention portion 262 in order to increase coupling force with the second fixing portion 241e. In addition, a sixth projection 262b, which protrudes in one direction, may also be further formed at a center of the second withdrawal prevention portion 262.

The one or more ribs 211 formed on the first side section 210, the one or more ribs 221 formed on the second side section 220, the one or more ribs 231 formed on the third side section 230, and the one or more ribs 241 formed on the fourth side section 240 can be formed with hollow spaces H therein, respectively. In one embodiment, the configurations of the ribs in FIG. 2 are similar to the configuration of the ribs in FIG. 1.

In one embodiment, since the first side section 210, the second side section 220, the third side section 230, and the fourth side section 240 are integrally formed, a separate coupling member for coupling the respective side sections (or frames) 210, 220, 230, and 240 is not required. For example, the first side section 210, the second side section 220, the third side section 230, and the fourth side section 240 are integrally formed by one injection molding process. In addition, because the one or more ribs 211, 221, 231, and 241 and the side sections 210, 220, 230, and 240 are integrally formed or manufactured when the refrigerator door frame is, a separate reinforcing member for reinforcing the respective side sections 210, 220, 230, and 240 is not required.

Figure 12:
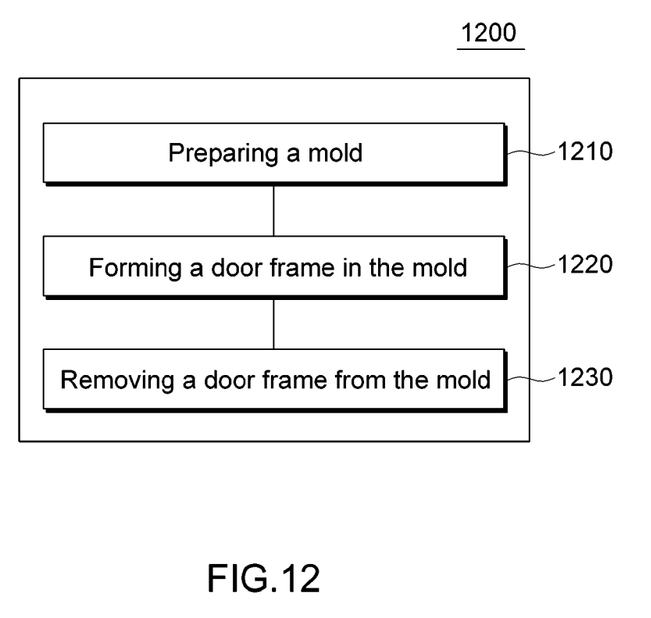
FIG. 12 is a flow chart of an exemplary method in accordance with one embodiment of the present disclosure.

FIG. 12 is a flow chart of an exemplary method 1200 in accordance with one embodiment of the present invention. Method 1200 is a process of manufacturing a refrigerator door frame. The door frame can be similar to the door frames illustrated in FIGS. 1 and 4.

In block 1210, a mold is prepared. The preparation can include designing and creating the mold. In one exemplary implementation a slide mold is used. The slide mold can by configured in accordance with the shape and contours of a door frame (e.g., similar to a door frame shown in FIG. 1, FIG. 4, etc.). The slide mold is used to injection-mold an article in a designed shape by allowing a mold core to be slid or moved by elasticity. Using the slide mold, the refrigerator door frame may be manufactured by one injection molding process.

In block 1220, a door frame is formed in the mold. In one embodiment, resin is injected into the slide mold, thereby forming a door frame (e.g., similar to a door frame shown in FIG. 1, FIG. 4, etc.). In one exemplary embodiment, one or more ribs may be formed on the respective side sections (or frames) by adjusting a movement direction of a slide core provided in the slide mold. The door frame is formed by injection molding without having the first panel seating member and the second panel seating member.

In block 1230, a door frame is removed from the mold. The refrigerator door frame can include a first side section, a second side section, a third side section, and a forth side section, integrally formed by injection molding using the slide mold. The refrigerator door frame can formed by injection molding in a state in which the one or more ribs are formed on the first side section, the second side section, the third side section, and the fourth side section, respectively.

Figure 13:
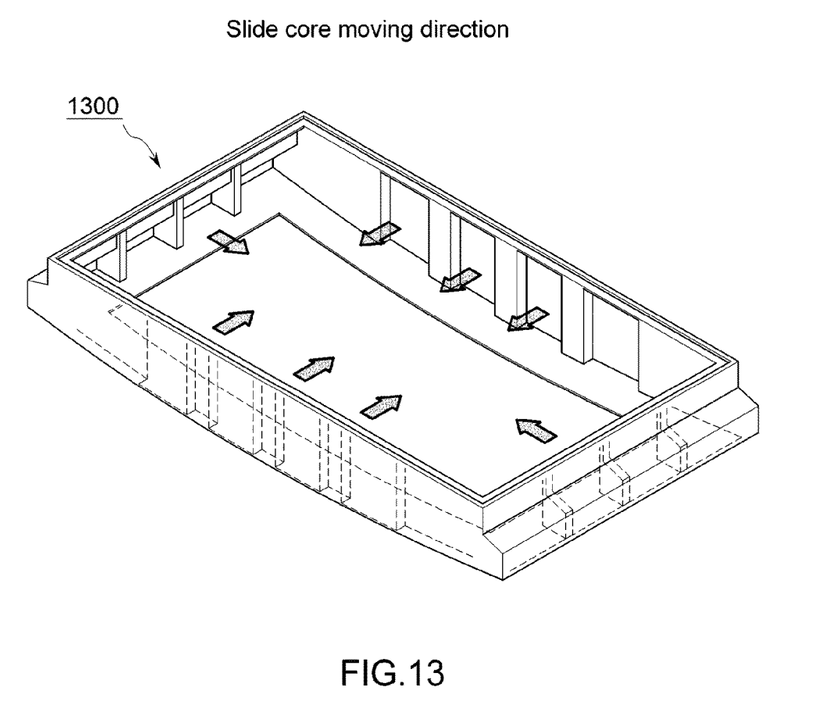
FIG. 13 is a block diagram of exemplary slide core moving directions in accordance with one embodiment of the present disclosure.
Figure 14:
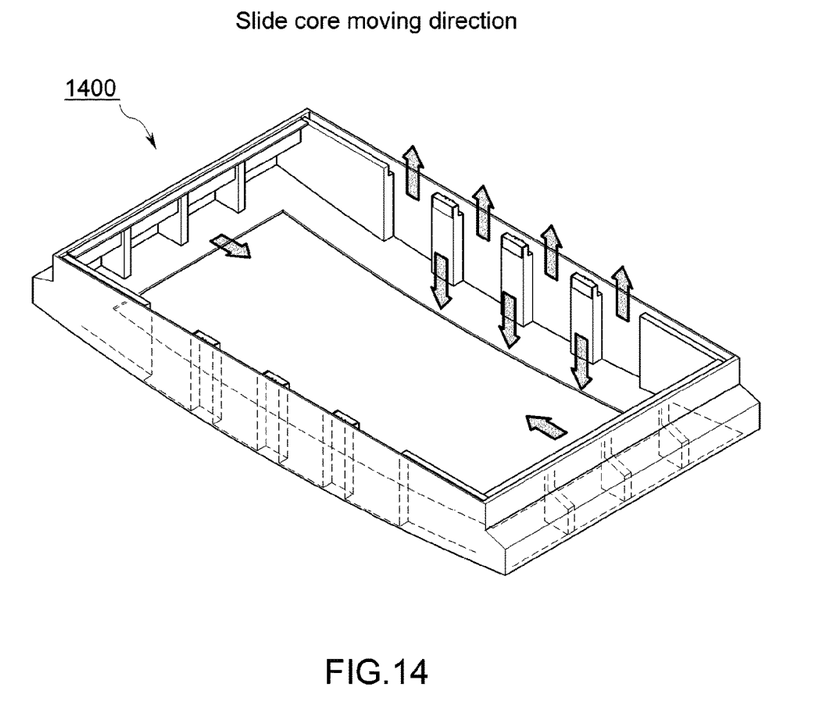
FIG. 14 is a block diagram of exemplary slide core moving directions in accordance with another embodiment of the present disclosure.

FIG. 13 is a block diagram of exemplary slide core moving directions in accordance with one embodiment of the present disclosure. The arrows indicate the movement of slide core portions from the refrigerator door frame 1300. In one exemplary implementation, refrigerator door frame 1300 is similar to the refrigerator door frame illustrated in FIG. 1. FIG. 14 is a block diagram of other exemplary slide core moving directions in accordance with one embodiment of the present disclosure. The arrows indicate the movement of slide core portions from the refrigerator door frame 1400. In one exemplary implementation, refrigerator door frame 1400 is similar to the refrigerator door frame illustrated in FIG. 4.

It is appreciated a variety of different resins can be used. In one embodiment, ABS resin (acrylonitrile-butadiene-styrene resin) is used.

In one embodiment, a door frame is included in door of a refrigerator. The refrigerator can store food in a controlled temperature environment (e.g., to help food cool, keep food fresh, etc.) of a storage chamber that is accessible through the door which opens and closes. The door includes a front panel, a door handle which is coupled to the front panel and used to open and close the door, a rear panel, and a door frame which is coupled between the front panel and the rear panel.

Figure 11:
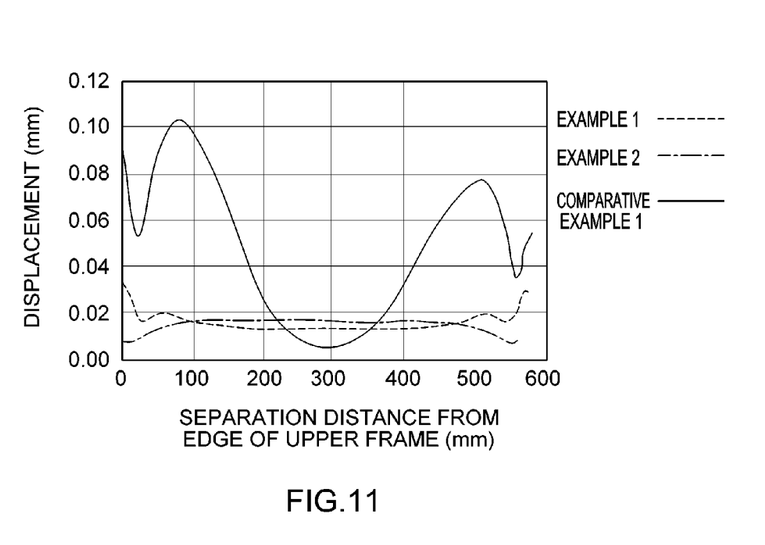
FIG. 11 is a graph illustrating a result of evaluating durability of various refrigerator door frames.

FIG. 11 is a graph illustrating a result of evaluating durability of various refrigerator door frame examples. A refrigerator door frame (horizontal length: 700 mm, vertical length: 300 mm), which has the structure illustrated in FIG. 1, is three-dimensionally designed using an NX NASTRAN program, and then a degree at which the refrigerator door frame is deformed is analyzed after force of 100 N is applied to the refrigerator door frame, and a result thereof is illustrated in the graph as example 1

A refrigerator door frame (horizontal length: 700 mm, vertical length: 300 mm), which has the structure illustrated in FIG. 4, is three-dimensionally designed using the NX NASTRAN program, and then a degree at which the refrigerator door frame is deformed is analyzed after force of 100 N is applied to the refrigerator door frame, and a result thereof is illustrated in the graph as example 2.

A refrigerator door frame, which has the same size as the refrigerator door frame of Example 1 and has a structure in which three reinforcing members are separately provided on respective side sections (or frames) (that is, ribs are not formed integrally with the respective side sections), is three-dimensionally designed using the NX NASTRAN program, and then a degree at which the refrigerator door frame is deformed is analyzed after force of 100 N is applied to the refrigerator door frame, and a result thereof is illustrated in the graph as comparative example.

With reference to the graph it is illustrated that the refrigerator door frame according to the present disclosure is less bent and deformed than the refrigerator door frame assembly in the related art other example, and has excellent durability.

It is appreciated that some portions or parts of embodiments have been described with respect to spatial relationships to one another (e.g., particular location, particular orientation, upper, lower, etc.). The indication of a spatial relationship can be with respect to the arrangement in the Figures. It is appreciated that the orientation or location of the portions or parts of embodiments can change. For example, a refrigerator door frame can be shown in a particular orientation in a Figure which can change when the refrigerator door frame is installed in a completed final refrigerator product. For example, section 130 can be referred to as an upper side section with respect to FIG. 1 and be referred to as a lateral side section with respect to a completed final refrigerator product.

Portions of the detailed description are presented and discussed in terms of a method. Although steps and sequencing thereof are disclosed in figures herein describing the operations of this method, such steps and sequencing are exemplary. Embodiments are well suited to performing various other steps or variations of the steps recited in the flowchart of the figure herein, and in a sequence other than that depicted and described herein.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A refrigerator door frame comprising:
    a first side section forming a first side of the door frame;
    a second side section forming a second side of the door frame;
    a third side section forming a third side of the door frame, the third side section integrally coupled to the first side section and the second side section; and
    a fourth side section forming a fourth side of the door frame; the fourth side section integrally coupled to the first side section and the second side section;
    wherein the first side section, the second side section, the third side section, and the fourth side section are integrally formed with one another, and
    one or more ribs are formed on the first side section, the second side section, the third side section, and the fourth side section, respectively,
    wherein the first side section and the second side section are opposite one another, the first side section includes:
a first seating frame portion which is operable to be coupled to a front panel;
a first supporting frame portion which is extended from the first seating frame portion; and
a second seating frame portion is extended from the first supporting frame portion, wherein the second seating frame portion is operable to be coupled to a rear panel;
wherein the one or more ribs on the first side section is integrally coupled to one surface of the first seating frame portion, one surface of the first supporting frame portion, and one surface of the second seating frame portion; and
the second side section includes:
a third seating frame portion which is operable to be coupled to the front panel;
a second supporting frame portion which is extended from the third seating frame portion; and
a fourth seating frame portion which is extended from the second supporting frame portion, wherein the fourth seating frame portion is operable to be coupled to the rear panel;
wherein the one or more ribs on the second side section is integrally coupled to one surface of the third seating frame portion, one surface of the second supporting frame portion, and one surface of the fourth seating frame portion,
the third side section includes:
a fifth seating frame portion which is operable to be coupled to a front panel;
a third supporting frame portion which is extended from the fifth seating frame portion; and
a sixth seating frame portion which is extended from the third supporting frame portion, wherein the sixth seating frame portion is operable to be coupled to a rear panel; and
wherein the one or more ribs formed on the third side section is integrally coupled to one surface of the fifth seating frame portion, one surface of the third supporting frame portion, and one surface of the sixth seating frame portion;

the fourth side section includes:
a seventh seating frame portion which is operable to be coupled to a front panel;
a fourth supporting frame portion which is extended from the seventh seating frame portion; and
an eighth seating frame portion which is extended from the fourth supporting frame portion, wherein the eighth seating frame portion is operable to be coupled to a rear panel;
wherein the one or more ribs formed on the fourth side section is integrally coupled to one surface of the seventh seating frame portion, one surface of the fourth supporting frame portion, and one surface of the eighth seating frame portion.

2. The refrigerator door frame of claim 1, wherein the first side section, the second side section, the third side section, and the fourth side section are integrally formed by an injection molding process.

3. The refrigerator door frame of claim 1, wherein the rib has a hollow space.

4. A method of manufacturing a refrigerator door frame of claim 1, comprising:
  a) preparing a slide mold;
  b) forming the door frame in the slide mold, including injecting resin, and integrally forming the refrigerator door frame, which includes the first side section, the second side section, the third side section and the fourth side section wherein the one or more ribs are formed on the first side section, the second side section, the third side section, and the fourth side section, respectively; and
  c) removing the door frame from the slide mold.

5. The method of claim 4, wherein a hollow space is formed in the one or more ribs.

6. The method of claim 4, wherein the one or more ribs are formed integrally with the first side section, the second side section, the third side section and the fourth side section by adjusting a movement direction of a slide core in the slide mold.

* * * * *